Oct. 18, 1949.    G. P. MUELLER    2,485,106
STREPTOMYCIN PURIFICATION
Filed Nov. 8, 1946
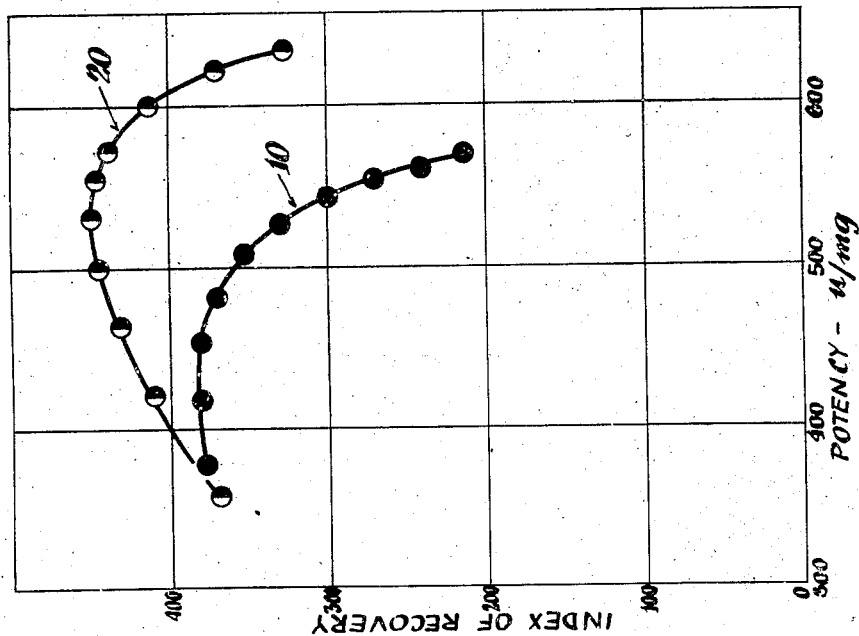
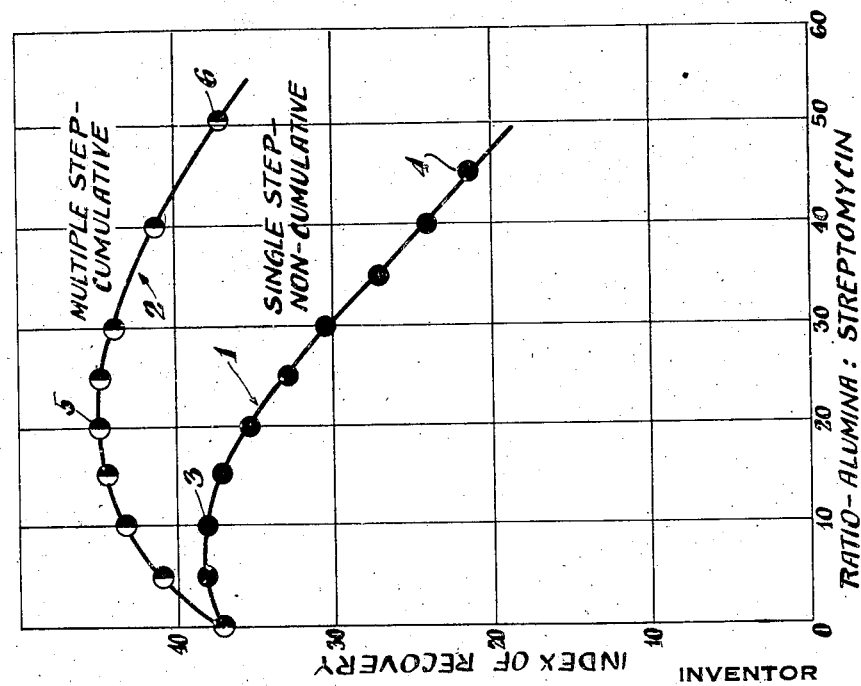
INVENTOR
George P. Mueller
BY
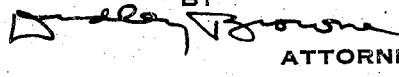
ATTORNEY Patented Oct. 18, 1949

2,485,106

UNITED STATES PATENT OFFICE 2,485,106

STREPTOMYCIN PURIFICATION

George P. Mueller, Philadelphia, Pa., assignor to Wyeth Incorporated, Philadelphia, Pa., a corporation of Delaware Application November 8, 1946, Serial No. 708,624

8 Claims. (Cl. 260—210)

1

This invention relates to a method of streptomycin purification in which impurities are selectively adsorbed from an alcoholic or similar solution of impure streptomycin to finely divided alumina.

Among the more recently developed antibiotics streptomycin takes an important position; consequently economical methods of recovering and purifying it are important. Its recovery and purification, however, offer difficulties not met with, for example, in the case of penicillin, since streptomycin is a water-soluble base that cannot be economically extracted from aqueous solution by available immiscible solvents; furthermore, streptomycin is irreversibly deactivated by exposure in solution to strongly acid or alkaline conditions.

Streptomycin may be recovered from the culture solution in which it is first produced by adsorption to activated carbon followed by washing and elution from the carbon with dilute methanolic hydrochloric acid. Crude streptomycin hydrochloride recovered from this solution ordinarily has a potency in the approximate range of 200–250 u./mg. (units per milligram).

It has been proposed to purify such crude streptomycin by passing it slowly in aqueous methanol solution through a column of sulfuric-acid-washed and water-washed alumina and thereafter washing the alumina with aqueous methanol. Successive fractions of the effluent have been found to rise in antibiotic activity from zero to a high value and then to decline again to a very low value. The streptomycin in the high-activity fractions is a relatively highly purified product and can be recovered as such. This method, while effective, has the disadvantage that it involves adsorbing all the streptomycin as well as attendant impurities to the activated alumina and thereafter selectively eluting the streptomycin while leaving the impurities behind.

It is one object of my invention to provide an improved and efficient adsorption method for purifying large quantities of streptomycin.

It is another object of my invention to provide an adsorption method for purifying streptomycin which does not necessitate adsorption of substantial amounts of streptomycin.

It is a further object of my invention to provide a method of selectively removing impurities from an alcoholic solution of crude streptomycin.

Other objects and advantages of my invention will be apparent from the following description.

I have discovered that by agitating finely divided alumina with an alcoholic or similar solution of a crude streptomycin salt under certain limited conditions I may preferentially remove impurities while leaving the major part of the streptomycin in solution and may then recover from the treated solution a good yield of streptomycin of increased purity and potency.

The form of adsorbent that I have found particularly effective is comminuted alumina that has been washed with dilute aqueous sulfuric acid and then washed free of sulfate ion with water.

The streptomycin solution treated is preferably a methanol solution. The solution may be anhydrous or may contain a minor amount of water. I have had good results with absolute methanol and with mixtures of, respectively, 95 volumes of methanol with 5 volumes of water, and 80 volumes of methanol with 20 volumes of water. My process is still workable, but less advantageously with equal volumes of methanol and water.

In the specification and claims when I refer to a solvent such as methanol as "80 percent methanol" I mean 80 parts of methanol by volume mixed with 20 parts of water by volume, and similarly for other percentages and solvents.

In place of methanol I may use aqueous ethanol, isopropanol or acetone containing minor amounts of water, but I have found the use of methanol preferable.

Crude streptomycin is usually available as a hydrochloride, probably the trihydrochloride, and my purification method is well adapted to treat this salt; but I have also successfully applied it to a phosphate-hydrochloride. Other salts, such as the sulfate, are likewise amenable to purification by my method.

In the present specification and claims, for the sake of simplicity I use "streptomycin" in a broad sense, where the meaning is clear, to include the free base and its salts.

The potency concentration of streptomycin in the solutions treated may vary over a wide range—e. g. from 4000 to 20,000 units per milliliter, the optimum in any case being determined by the physical and economic conditions of the operation. I prefer to treat a crude material having a potency of 200–400 u./mg.

In view of the chromatographic work reported on streptomycin it might be thought that the impurities could be preferentially removed from crude streptomycin by percolating solutions of the latter through a shallow bed of adsorbent. I have found, however, that this is unsatisfactory because of theoretical and practical difficulties. With a thin layer of adsorbent, channeling is more likely to occur and its adverse effect on the process is greater than with layers of considerable depth; duplication of conditions is more difficult than with deep layers; the equilibrium set up between moving solution and adsorbent is a dynamic one, the constants and optimum conditions of which are difficult to determine satisfactorily because of the difficulty of duplicating shallow adsorbent beds and the less satisfactory statistical situation as compared with deep beds; determination of the capacity of the beds is unsatisfactory; for all these reasons I have found that the precise control of the operation necessary for efficient operation is practically impossible to obtain by percolation through shallow beds.

By bringing crude streptomycin solutions into contact with predetermined amounts of suitable adsorbents under conditions such that a desired static equilibrium is set up, I avoid all these difficulties. This process is especially advantageous and economical where large amounts of streptomycin have to be prepared of required activity and purity for therapeutic use. I use the term "static" in this connection to imply a substantially stable condition of a definite amount of solution and a definite amount of adsorbent as respects distribution of solutes; it is not intended to exclude the possibility of a continuous interchange of material between solution and adsorbent provided this is a balanced exchange.

According to my invention I prepare a solution of a streptomycin salt, e. g. the trihydrochloride or a phosphate-hydrochloride, in a solvent such as methanol, e. g. 80 percent methanol, and agitate it in contact with a suitably prepared comminuted absorbent such as alumina treated as described above. The streptomycin solution is agitated with the adsorbent, as by shaking or stirring, until equilibrium is reached, which requires a relatively short time, usually less than an hour, and is then separated from the adsorbent as by pressure or vacuum filtration through a glass filter medium. Washing the adsorbent after the filtration brings about elution of some of the adsorbed impurities as well as elution of both streptomycin adsorbed and streptomycin present in the mechanically retained solution; thus the net effect of washing is to destroy the equilibrium between solution and adsorbent and to bring through the filter material of lower potency than is contained in the original filtrate. Accordingly, if the adsorbent is washed, the washings are preferably collected separately and treated as such; or, alternatively, at least part of the washings may be used for dissolving a succeeding batch of crude streptomycin concentrate prior to treatment with alumina. Under favorable conditions such a recycling operation is profitable and increases the over-all yield of the purified material.

The original filtrate is evaporated under vacuum at room temperature to remove the bulk of solvent, water may be added if necessary, and the residue freeze-dried under high vacuum. Alternatively, if methanol or low water content is used, the streptomycin may be precipitated with acetone, filtered, washed with ether and dried. If the initial crude streptomycin salt had a potency of about 200 u./mg. or above, the product of the final operation is a dry streptomycin powder usually having a potency in the range of 450–600 u./mg. or more; the total activity recovered depends upon the conditions of the operation and the degree of purification attained. Yields of 60–85 percent of total activity are generally compatible with recovery of products having a potency of 500 u./mg. or more.

In my work activities were customarily determined by microbiological assay (cup plate and disc method), but spectrophotometric assay was also used. The standard unit was the microgram or gamma ($\gamma$) of pure streptomycin free base. Pure streptomycin hydrochloride has a potency of 850 $\gamma$/mg. or 850 u./mg. with reference to the pure free base having 1000 u./mg. potency.

Instead of depending on one adsorptive treatment I may treat the crude streptomycin in successive steps with fresh portions of alumina. The production of a product of a given desired potency by such stepwise treatments may be realized with increased over-all yield and reduced consumption of adsorbent as compared with a single-step adsorptive treatment. The number of treatments to be used in a given case is determined chiefly by the potency of the crude and the required yield and potency of the finished product.

A still further increase in efficiency may be effected by a countercurrent-batch operation in which alumina and streptomycin solution are moved in opposite directions through a series of adsorption stages. In each stage solution and adsorbent are agitated together as described above, allowed to settle, and separated. Adsorbent and solution are then transferred in opposite directions, each to an adjacent stage or an exit from the series. Fresh alumina is thus used to treat nearly purified solution, while fresh solution is treated by nearly exhausted alumina.

One index of the effectiveness of the process, which I call the "index of recovery," is obtained by multiplying the potency of the product obtained (expressed as units per milligram) by the percentage of the total activity of the starting product recovered in the process.

In appended Fig. 1 I have plotted results obtained with varying amounts of alumina used once — curve 1 — and with successive treatments of the same solution with smaller amounts of alumina — curve 2. Curves 1 and 2 were derived from curves of most probable values drawn on plots of original experimental determinations of potency and weight. The abscissae in both cases are the ratios of weight of alumina to weight of substance treated; for curve 2 the cumulative weight of alumina is taken. The ordinates in both cases are the indices of recovery as defined above.

In the case of the single treatments, curve 1, under the conditions of the experiment, a ratio of approximately 9 g. of alumina per gram of substance gives a maximum index; thereafter the index falls rapidly. Point 3 represents a product having a potency of approximately 450 u./mg. obtained in approximately 85% yield based on total activity recovered. The maximum potency obtained in this series, 572 u./mg., is represented by point 4; in this case, however, the yield was only about 40% of the total activity.

Where successive treatments were given, the maximum index as shown by curve 2 was obtained under the experimental conditions by the use of a total of approximately 20 g. alumina per gram of substance. Point 5 at this maximum represents material having a potency of approximately 530 u./mg. obtained in 85% yield based on total activity. The maximum potency shown in this series was approximately 620 u./mg. represented by point 6, the yield in this case being approximately 60% of the total activity. It will be seen that the index of recovery falls off much less rapidly with increased amounts of alumina when these are used in successive treatments—curve 2—than when used in single treatments—curve 1. In other words, for any given ratio of alumina to material, a higher index of recovery is obtained by successive treatments.

Another way of representing the data of the same experiments is to plot the index of recovery against the potency of the recovered products. This is shown in Fig. 2, where the ordinates are the same as in Fig. 1 but the abscissae are potencies in u./mg. of product. The curves were derived from experimental data in the same way as those of Fig. 1. This representation is useful, since if a minimum potency must be met, a corresponding abscissa may be drawn and the practically realizable indices of recovery to the right of the abscissa then obtained by inspection.

In Fig. 2, curve 10 represents the approximate mean (by inspection) of the results obtained by single treatments with varying amounts of alumina. Curve 20 represents the results of successive treatments (as in Fig. 1, curve 2). Again it will be seen that for any given potency, a higher index of recovery is obtained by successive alumina treatments. In general the total amount of alumina used per gram of streptomycin should not exceed 60 g.

Specific examples embodying my invention follow, but it is to be understood that these are intended to be illustrative only and not to limit my invention, the scope of which is defined in the appended claims.

EXAMPLES

*General.*—The solvents used were of reagent grade or were of high commercial grade subjected to further purification before use. The alumina was a fine grade, mostly of 150–300 mesh and finer. It was treated by stirring with dilute sulfuric acid at about pH 5.7–6.0, then washing with distilled water until free of sulfate ion (the final wash water having a pH of about 6.0–6.2), and drying in a steam heated oven or at 100° in vacuo.

The streptomycin used was produced by adsorbing the activity and impurities from surface-culture broths to activated charcoal, washing the charcoal with water and drying by suspending in acetone. The activity was eluted with methanol containing hydrochloric acid, the eluate neutralized over an anion-exchange material, "Amberlite," and, after treatment with 1–2% of charcoal, the product precipitated with acetone.

The stated activities are averages of several biological assays.

A solution of known concentration of streptomycin was made up in the indicated solvent and to a known volume of solution was added a weighed amount of adsorbent. The mixture was agitated in a closed vessel for 10–50 minutes at room temperature; then, after insuring a uniform dispersion of the adsorbent, the mixture was filtered under slight air pressure, approximately 1 cm. of mercury, which at the end of the filtration was increased to 10–20 cm. of mercury for a short time to force through the last of the filtrate. The filtrate was evaporated under vacuum without heating until substantially all of the solvent had been removed. The residue was diluted with about 3 ml. water, frozen, and freeze-dried. The dry residue was quickly ground to insure uniform sampling, transferred to small vials, and re-dried in vacuo over calcium chloride. Portions of this material were then taken for assay. In calculating results a correction was made for solution mechanically held back by the filter since this represents material recoverable in routine operation.

EXAMPLE 1

A solution of 0.360 g. of streptomycin trihydrochloride having a potency of 235 u./mg. and a total activity of 84,600 units, in 10 cc. of 80% methanol was shaken with 2.0 g. alumina for 10 minutes. The solution was considerably decolorized at this stage; it was centrifuged, decanted and shaken for 30 minutes with an additional 2.0 g. of alumina. The colorless solution was decanted and freeze-dried, giving 0.1491 g. of solid (41.5%) showing a potency of 508 u./mg., or a total recovery of 75,500 units (89%).

EXAMPLE 2

A weighed amount of streptomycin was dissolved in a measured volume of 80% methanol and the resulting solution divided into portions of equal volume. Each portion was separately shaken with alumina for 50 minutes, the amount of alumina varying from portion to portion. The liquid was then filtered off, the dissolved streptomycin recovered as described above, and assayed. The results are shown in Table 1.

*Table 1*

Potency of Starting Material, 380 u./mg.
Initial Concentration of Solution, 1.667 g./100 ml. Solution

| 1 | 2 | 3 | 4 |
|---|---|---|---|
| Test No. | Potency u./mg. | Ratio— g. Alumina g. Material | Percent Recovery of Original Activity |
| 1 | 430 | 3.60 | 92.8 |
| 2 | 433 | 7.20 | 86.7 |
| 3 | 493 | 10.80 | 82.6 |
| 4 | 479 | 14.40 | 78.3 |
| 5 | 466 | 18.00 | 72.4 |
| 6 | 493 | 21.60 | 67.4 |
| 7 | 509 | 25.20 | 61.9 |
| 8 | 542 | 28.80 | 57.3 |
| 9 | 484 | 32.40 | 52.5 |
| 10 | 533 | 36.00 | 48.0 |
| 11 | 572 | 43.20 | 50.0 |

EXAMPLE 3

A portion of streptomycin dissolved in 80% methanol was given successive treatments with alumina, each treatment consisting of shaking with alumina for 10 minutes and filtering; an aliquot was removed from each filtrate for assaying and isolation of streptomycin before the subsequent treatment of the bulk of the filtrate. The amount of alumina in each treatment was adjusted to the diminishing volume of filtrate and amount of streptomycin present. Results are shown in Table 2.

*Table 2*

Potency of Starting Material, 380 u./mg.
Initial Concentration of Solution, 1.665 g./100 ml. Solution

| 1 | 2 | 3 | 4 | 5 |
|---|---|---|---|---|
| Step | Potency, u./mg. | Ratio— g. Alumina g. Material | Cumulative Ratio— g. Alumina g. Material | Percent Recovery of Original Activity |
| 1 | 407 | 3.60 | 3.60 | 99 |
| 2 | 451 | 4.65 | 8.25 | 95 |
| 3 | 513 | 5.38 | 13.63 | 90 |
| 4 | 482 | 6.63 | 20.26 | 85 |
| 5 | 567 | 8.61 | 28.87 | 75 |
| 6 | 599 | 12.05 | 40.92 | 69 |
| 7 | 628 | 17.40 | 58.32 | 53 |

I claim:

1. The process of purifying a crude soluble streptomycin salt, which comprises agitating comminuted alumina with said crude streptomycin salt dissolved in a water-miscible organic solvent therefor, the alumina being present in an amount substantially less than will remove all streptomycin from the solution, separating alumina and solution, and recovering from the solution streptomycin of increased potency.

2. The process defined in claim 1, in which the solvent for streptomycin comprises an aliphatic alcohol containing not more than three carbon atoms in its molecule and boiling below 90° C.

3. The process defined in claim 1, in which the solvent for streptomycin comprises methanol.

4. The process of purifying a crude soluble streptomycin salt, which comprises preparing a methanolic solution of said crude streptomycin salt having a potency concentration in the range 4000–20,000 u./ml., treating the solution with finely divided alumina by agitating the alumina in the solution for a sufficient time to selectively adsorb impurities therefrom, the amount of alumina being less than will adsorb a major fraction of the dissolved streptomycin, thereafter separating the treated solution from the alumina, and recovering streptomycin of enhanced potency from the separated solution.

5. The process defined in claim 4, in which the streptomycin solution is treated with alumina in a plurality of successive steps, the streptomycin solution being separated from the alumina used in a preceding step before treatment with other alumina in a succeeding step, and the total amount of alumina used being not over 60 grams per gram of streptomycin.

6. The process of purifying a crude soluble streptomycin salt, which comprises: providing a solution of said crude streptomycin salt having a potency in the range 200–400 u./mg., the streptomycin being present in the solution in a potency concentration in the range 4000–20,000 u./ml. and the solvent being 50–100 percent methanol; agitating the solution with comminuted acid-washed and water-washed alumina in a plurality of steps, alumina and solution being separated before treatment of solution with alumina in any succeeding step, the amount of alumina used in any one step being substantially less than will adsorb all the streptomycin in solution, and the total amount of alumina used being less than 60 grams per gram of streptomycin treated; separating solution and alumina after the final alumina treatment; and recovering streptomycin of enhanced purity from the separated solution.

7. The process defined in claim 6, in which the recovery of streptomycin from the separated solution is effected by low-temperature evaporative concentration of the separated solution and freeze-drying of the evaporation residue.

8. The batch-countercurrent process of purifying a crude soluble streptomycin salt which comprises: preparing a lower-alcoholic solution of said salt, successively introducing, treating and removing a series of charges of said solution progressively in a series of treating stages, the charges treated in each stage but the first being those removed from the next previous stage, successively introducing a series of charges of comminuted acid-washed alumina into each of said stages, agitating each charge with a charge of streptomycin solution and removing it therefrom, the alumina introduced into each stage but the last being that removed from the succeeding stage in the series, fresh alumina being introduced into the last stage and depleted alumina being removed from the first stage of the series, untreated solution being introduced into the first stage and treated solution being removed from the last stage of the series, and recovering streptomycin of enhanced potency from said treated solution, the amount of alumina used being less than 60 grams per gram of streptomycin treated.

GEORGE P. MUELLER.

No references cited.

Certificate of Correction

Patent No. 2,485,106　　　　　　　　　　　　　　　　October 18, 1949

GEORGE P. MUELLER

It is hereby certified that errors appear in the printed specification of the above numbered patent requiring correction as follows:

Column 3, line 34, for the word "absorbent" read *adsorbent*; column 3, line 63, for "or low" read *of low*; column 4, line 40, after "curve 1—" insert a comma; column 6, Table 1, fourth column thereof, last line, for "50.0" read *40.0*; same column 6, line 60, for "380 u./mg." read *360 u./mg.*;

and that the said Letters Patent should be read with these corrections therein that the same may conform to the record of the case in the Patent Office.

Signed and sealed this 25th day of April, A. D. 1950.

[SEAL]

THOMAS F. MURPHY,
*Assistant Commissioner of Patents.*